United States Patent
Batista Reyes et al.

(10) Patent No.: US 7,805,428 B2
(45) Date of Patent: Sep. 28, 2010

(54) SEO SUITE AND SUB-COMPONENTS

(75) Inventors: Hamlet Francisco Batista Reyes, Santo Domingo (DO); Juan Rafael Castro Matias, Santo Domingo (DO); Harold Lawrence Marzan Mercado, Santo Domingo Este (DO)

(73) Assignee: Nemediasoft Inc., Orlando, FL (US)

( * ) Notice: Subject to any disclaimer, the term of this patent is extended or adjusted under 35 U.S.C. 154(b) by 559 days.

(21) Appl. No.: 11/951,576

(22) Filed: Dec. 6, 2007

(65) Prior Publication Data

US 2009/0150372 A1 Jun. 11, 2009

(51) Int. Cl.
*G06F 17/30* (2006.01)
(52) U.S. Cl. .................. 707/706; 707/709; 707/716; 707/723; 707/726; 707/758; 707/770
(58) Field of Classification Search .................. 707/706, 707/709, 716, 723, 726, 758, 770, 999.003, 707/999.005, 999.01, 999.107, 3, 5, 10, 104.1
See application file for complete search history.

(56) References Cited

U.S. PATENT DOCUMENTS

| | | | | |
|---|---|---|---|---|
| 7,685,191 | B1 * | 3/2010 | Zwicky et al. | 707/706 |
| 2006/0224593 | A1 * | 10/2006 | Benton et al. | 707/10 |
| 2009/0132524 | A1 * | 5/2009 | Stouffer et al. | 707/5 |
| 2009/0292677 | A1 * | 11/2009 | Kim | 707/3 |
| 2009/0299998 | A1 * | 12/2009 | Kim | 707/5 |

* cited by examiner

*Primary Examiner*—Don Wong
*Assistant Examiner*—Thanh-Ha Dang
(74) *Attorney, Agent, or Firm*—White-Welker & Welker, LLC

(57) ABSTRACT

The present invention is a SEO suite comprising several modules that in combination or alone may are novel and non-obvious. These modules are: smart tools that provide isolation and workflow collaboration of tools in an SEO suite; using log files for key-wordless rank checking in an SEO tool; using log files for hyperlink analysis in an SEO tool; identifying web authorities for competitive analysis in an SEO tool; live relevancy metrics in on-page optimization editor (SEO tool); and a rotating authorization code to prevent the use of a software license in more than one machine.

24 Claims, 15 Drawing Sheets

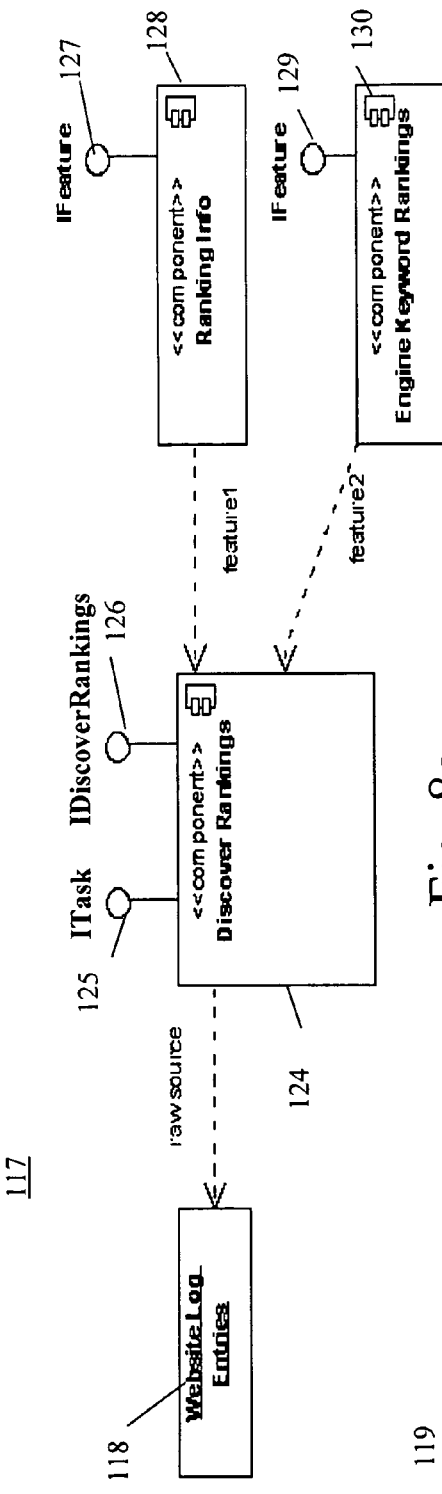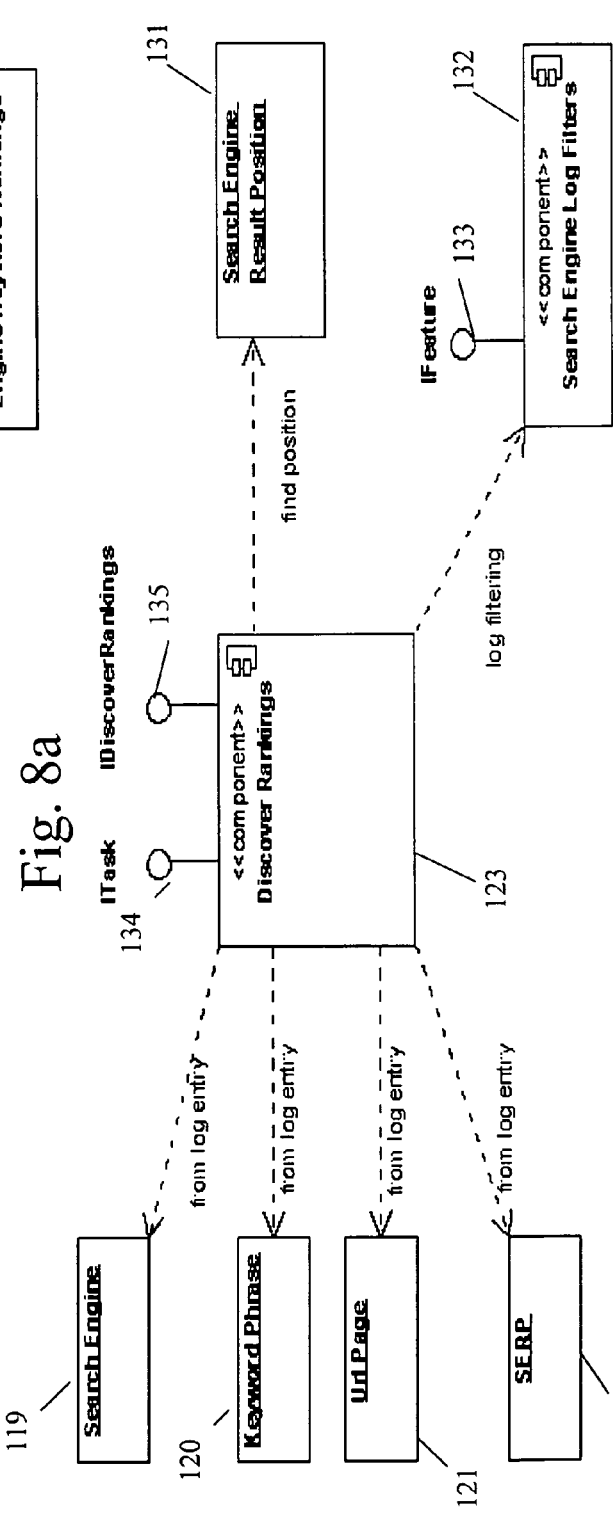
Fig. 8a
Fig. 8b

SEO SUITE AND SUB-COMPONENTS

FEDERALLY SPONSORED RESEARCH

Not Applicable

SEQUENCE LISTING OR PROGRAM

Not Applicable

CROSS REFERENCE TO RELATED APPLICATIONS

Not Applicable

TECHNICAL FIELD OF THE INVENTION

The present invention relates generally to an SEO suite. More specifically the present invention relates to an SEO suite comprising several modules.

BACKGROUND OF THE INVENTION

A search engine optimization (SEO) suite is usually composed of several tools where each tool performs a very specific task, such as: keyword research, rank checking, link popularity check, crawlability tests, etc. In current suites there is limited or no collaboration between the different tools. Vendors expect users to be experts and to operate the tools as if the SEO suite is simply a toolbox and not a fully integrated machine.

Therefore what is needed is a SEO suite, that utilizes tools which are 'smart' in the sense that they are fully aware of other tools in the suite and what information they can collect from them, so that they don't need to ask the user again and again if they can obtain the information from data provided to a previously run tool or from its output (outcome). The tools should also have the ability to 'act dumb' as traditional SEO suites and request all information directly from the user. They should do this depending on the operating mode: smart mode or classic mode.

Traditional SEO software performs a task known as rank checking. For that task the user is required to provide: a) a list of keywords to check, b) one or several URLs and optionally c) a list of search engines. The tools then goes to each search engine and systematically checks every search engine result page to find the provided URL(s). The result of the tool is the list of specific positions the URLs have for the keywords and search engines. This presumes that the user knows what keywords people are typing to find the website.

What is needed is a tool that provides such functionality in our SEO suite that does not require any keywords or search engines to be provided before hand, only the site URL and a web server log file for the site that corresponds with the URL. The result of this is that users can check their rankings effortlessly, and the software will guess or discover the keywords and search engines users are using to find the user's site.

Traditional SEO software performs a task known as link popularity or backlink checking. Some more recent SEO tools go an extra step and perform what is known as link analysis—collecting the links and the anchor text (text inside the links) of those links (example http://seoelite.com). In order to collect the backlinks, traditional SEO software queries the search engines with the "link: or linkdomain:" command. The problem with that approach is that search engines limit the results to only a thousand links and some search engines (Google) do not provide reliable list of links or don't update the index with that information frequently enough. There is a large number of websites that get far more than a 1000 incoming links. Performing any type of analysis on such limited information means, that the SEO tools in the market don't provide meaningful results and don't help in such cases.

Therefore, what is needed is a tool that provides such functionality in an SEO suite that extracts a larger number of incoming links for the user website, because it extracts that information from the website's log file. The software should do this for every single page on the website automatically.

Traditional SEO tools analyze top 10 results by using statistical methods to compute relevancy metrics such as keywords density, prominence, weight, etc. The idea is to average the relevancy metrics of the top ten sites and use that average to optimizing the user's pages. There is a fundamental problem with that assumption. Averaging the metrics of all sites in the top ten for any search in a popular search engine, assumes all of them are ranking for the same reason. Unfortunately search engines use a lot more factors than just on-page relevancy metrics. Some sites rank for on-page metrics, others rank for off-page metrics and another for a mix of both. Extracting meaningful metrics that can be use to guide optimization work from disparate sources is extremely unreliable. Furthermore, there are sites that rank in the top ten short term (sites using black hat techniques) and there are sites that rank medium term and sites that rank long term. It is important in order to achieve solid rankings, that sites that rank long term are identified, and only the relevancy metrics be extracted from those.

Therefore, what is needed is a competitive intelligence tool in an SEO suite whose sole purpose is to identify sites in the top ten with solid rankings and only one of them is automatically selected based in the probability of the user's site matching or beating its rankings.

Traditional SEO suites include on-page optimization tools that perform on-page analysis: keyword density analysis, keyword prominence., etc. Some also include an HTML editor to make it easier for the user to make the necessary changes in the optimization process. Unfortunately, in order to see how the relevancy metrics are affected by the changes, the users need to upload the changes to their server and run separate tools every time they make a change. In a few cases the user makes changes locally on his computer, but yet needs to run the separate tool to see the new relevancy metrics.

What is needed is a SEO suite that includes an intuitive on-page optimization editor that not only uses the relevancy metrics extracted from the competing web authority as reference, but also shows the user's website relevancy metrics in a floating panel, that automatically updates as the user makes the changes to the web page.

Traditional licensing schemes generate a license key to a user and the user activates or unlocks the code by inputting that key on the software. Some software validate the licensing key on a remote server to make sure the license is not already in use. The problem with such scheme is that a clever user, such as a hacker, can activate a software on one computer and make an image (a duplicate of the licensed software) and copy it to one or more computers and the software will keep running, bypassing the licensing protection.

What is needed in order to prevent this problem, is when a user account is created, a license key and an authorization code must be created. This authorization code should have an expiration date on which time, the authorization code is used as the seed for a new one.

SUMMARY OF THE INVENTION

The present invention is a SEO suite comprising several modules which in combination or alone may be novel and non-obvious. These modules are: smart tools that provide isolation and workflow collaboration of tools in a SEO suite; using log files for key-wordless rank checking in a SEO tool; using log files for hyperlink analysis in an SEO tool; identifying web authorities for competitive analysis in an SEO tool; live relevancy metrics in on-page optimization editor (SEO tool); and a rotating authorization code to prevent the use of a software license in more than one machine.

Smart tools provide isolation and workflow collaboration of tools in an SEO suite. The present inventions tools are 'smart' in the sense that they are fully aware of other tools in the suite and what information they can collect from them so that they don't need to ask the user again and again if they can obtain the information from data provided to a previously run tool or from its output (outcome). The tools also have the ability to 'act dumb' as traditional SEO suites and request all information directly from the user. They do this depending on the operating mode: smart mode or classic mode. When 'acting smart' (smart mode), tools also 'know' if prerequisite tools have previously run, if not they don't make themselves available. When 'acting dumb' (classic mode) the user has the ability to 'force' the tool to explicitly collaborate for extra convenience.

The present invention, teaches a tool that provides using log files for key-wordless rank checking in a SEO tool functionality in a SEO suite that does not require any keywords or search engines to be provided before hand, only the site URL and a web server log file for the site that corresponds with the URL. The result of this is that our users can check their rankings effortlessly and the software will guess or discover the keywords and search engines users are using to find the user's site. The tool does this in two steps. The first step detects the search engine result page by studying the referrer information in the log files. An optional second step identifies the exact position on the search engine by querying the search engine directly on that specific page and a small window of one or two pages from the identified page. This reduces the amount of queries to search engines by a minimum.

The present invention provides a tool, that using log files for hyperlink analysis in a SEO tool of the SEO suite, extracts a larger number of incoming links for the user website, because it extracts that information from the website's log file. The tool does this for every single page on the website automatically. The tool uses the extracted hyperlink information, to identify link rich and link poor pages. Pages in the site, that doesn't get many links and pages on the site that get a lot of links. The idea is that the user can optimize the site by linking the link rich pages to the link poor ones.

Therefore, it is an objective of the present invention to teach a competitive intelligence tool in an SEO suite whose sole purpose is to identify sites in the top ten with solid rankings, and only one of them is automatically selected based in the probability of the user's site matching or beating its rankings. The tool performs some advanced analysis of the top 10 sites' traffic, age, links and other important quality metrics to help identify the long term winners from the lucky ones that will not rank for long. Only this chosen web authority is analyzed and its relevance profile is compared to user's site in the optimization process. Once the user's site is changed to match the profile of the winner, search engines will very likely reward the site with the desired high rankings.

It is another objective of the present invention to teach an intuitive on-page optimization editor for use in an SEO that not only uses the relevancy metrics extracted from the competing web authority as reference, but also show the user's website relevancy metrics in a floating panel that automatically updates as the user makes the changes to the web page. The floating panel visually shows the current values, the goal values and the action the user must take to get from the current value to the goal, in a visually intuitive way.

It is yet another objective of the present invention to teach a user account which utilizes a license key and an authorization code. This authorization code has an expiration date on which time, the authorization code is used as the seed for a new one. The application uses the new authorization code moving forward, and this keeps happening each time an authorization code expires. When the software runs on another machine with the same license and authorization code, only one of the machines will be in sync with the server. The rest will be out of sync as only the one that was able to renew the authorization code has the current one. The rest have the old one, and the system won't let them update.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

FIGS. 8a and 8b are flow charts illustrating the ranking process of the present invention;

DETAILED DESCRIPTION OF THE INVENTION

Figure 1:
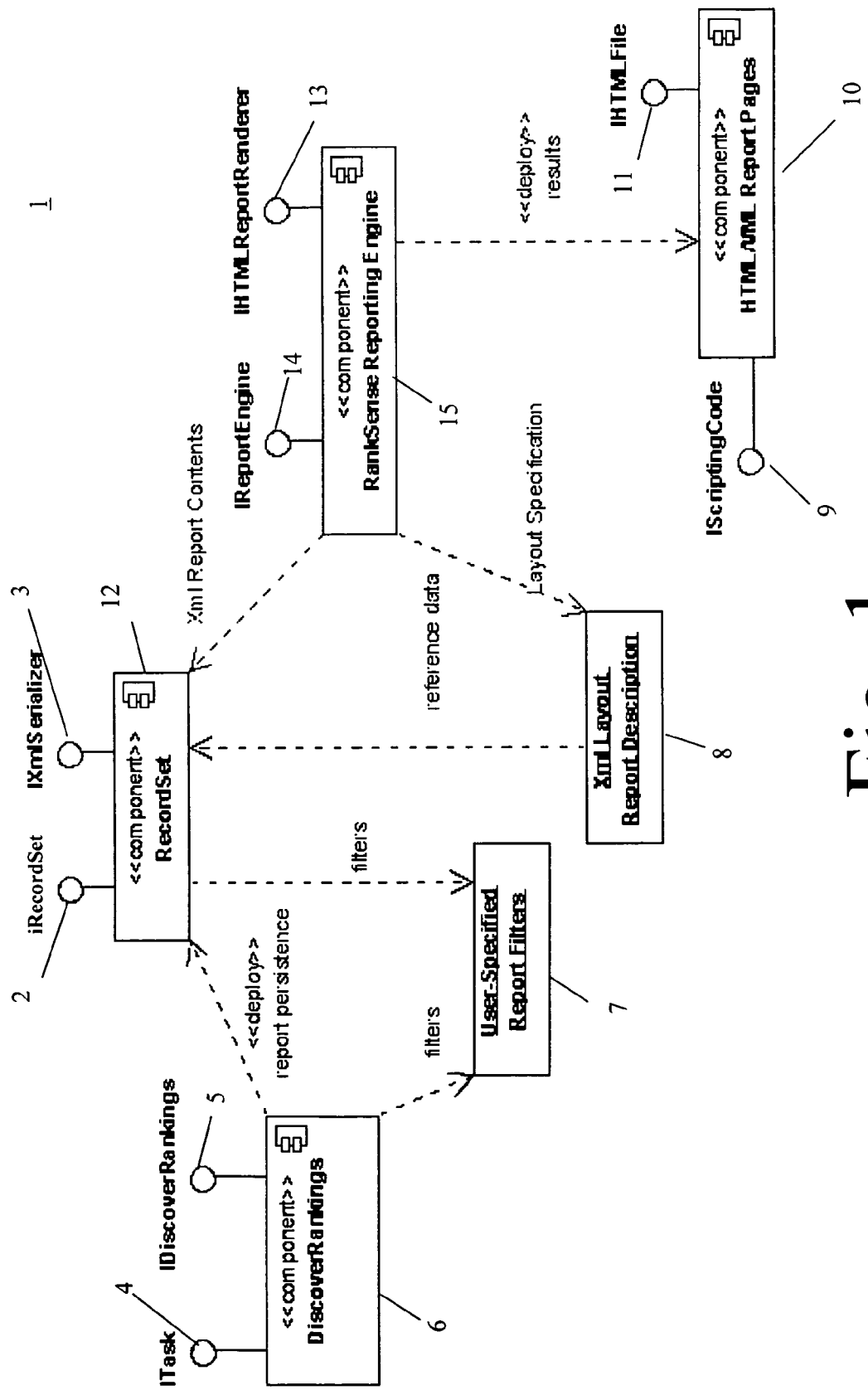
FIG. 1 is a flow chart illustrating the reporting system object model of the present invention.

In the following detailed description of the invention of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is therefore, not to be taken in a limiting sense, and the scope of the present invention is defined only by the appended claims.

The present invention is a SEO suite comprising several modules that in combination or alone may are novel and non-obvious. These modules are: smart tools that provide isolation and workflow collaboration of tools in a SEO suite; using log files for key-wordless rank checking in a SEO tool; using log files for hyperlink analysis in a SEO tool; identifying web authorities for competitive analysis in a SEO tool; live relevancy metrics in on-page optimization editor (SEO tool); and a rotating authorization code to prevent the use of a software license in more than one machine.

Smart tools provide isolation and workflow collaboration of tools in an SEO suite. The present inventions tools are 'smart' in the sense that they are fully aware of other tools in the suite and what information they can collect from them, so that they don't need to ask the user again and again if they can obtain the information from data provided to a previously run tool or from its output (outcome). The tools also have the ability to 'act dumb' as traditional SEO suites and request all information directly from the user. They do this depending on the operating mode: smart mode or classic mode. When 'acting smart' (smart mode) tools also 'know' if prerequisite tools have previously run, if not they don't make themselves available. When 'acting dumb' (classic mode) the user has the ability to 'force' the tool to explicitly collaborate for extra convenience.

The present invention teaches a tool that provides using log files for key-wordless rank checking in an SEO tool functionality in an SEO suite that does not require any keywords or search engines to be provided before hand, only the site URL and a web server log file for the site that corresponds with the URL. The result of this is that our users can check their rankings effortlessly, and the software will guess or discover the keywords and search engines they are using to find the user's site. The tool does this in two steps. The first step detects the search engine result page by studying the referrer information in the log files. An optional second step identifies the exact position on the search engine by querying the search engine directly on that specific page and a small window of one or two pages from the identified page. This reduces the amount of queries to search engines by a minimum.

A reporting engine 15 is an extension of the smart tools framework. Users can define and create arbitrary reports using information that is made available by the smart tools at runtime. The reports are defined with simple xml tags and the reporting engine extracts and combines the required data from the relevant smart tools. In addition to this, the reporting engine 15 provides advanced filtering capability 7 to limit the display of information to as much information as necessary.

The smart tools provide their information to the reporting engine 15 via record sets (raw data) 12. The reporting engine 15 receives a schema (xml document) that specifies the information to be displayed on the report. The reporting engine 15 uses the schema to determine the sources for the data (the smart tools), compiles the data to produce results, and generates and renders reports that include text and graphics.

Now referring to FIGS. 1, 2, 3, and 4, an example diagram of a smart tool, referred to as Discover Rankings, provides reporting information to the Reporting Engine 15 via a RecordSet 12. Specifically referring to FIG. 1 the Reporting System Object Model 1 is illustrated. ITask 4 and IDiscoverRankings interfaces, 5 are used to implement the DiscoverRankings component 6 that is then filtered based on User-Specified Report Filters 7 becomes part of the RecordSet 12. The RecordSet 12 is comprised of an IRecordSet 2 and IxmlSerializer 3. The RecordSet 12 received an XML Layout Report Description 8 that is specified by the reporting engine 15. The reporting engine, 15 consists of an IReportEngine 14 and an IHTMLReportRenderer interfaces, 13 which generates HTML/UML ReportPages 10 which implement IScriptingCode 9 and IHTMLFile interfaces, to be viewed as HTML documents. 11.

Figure 2:
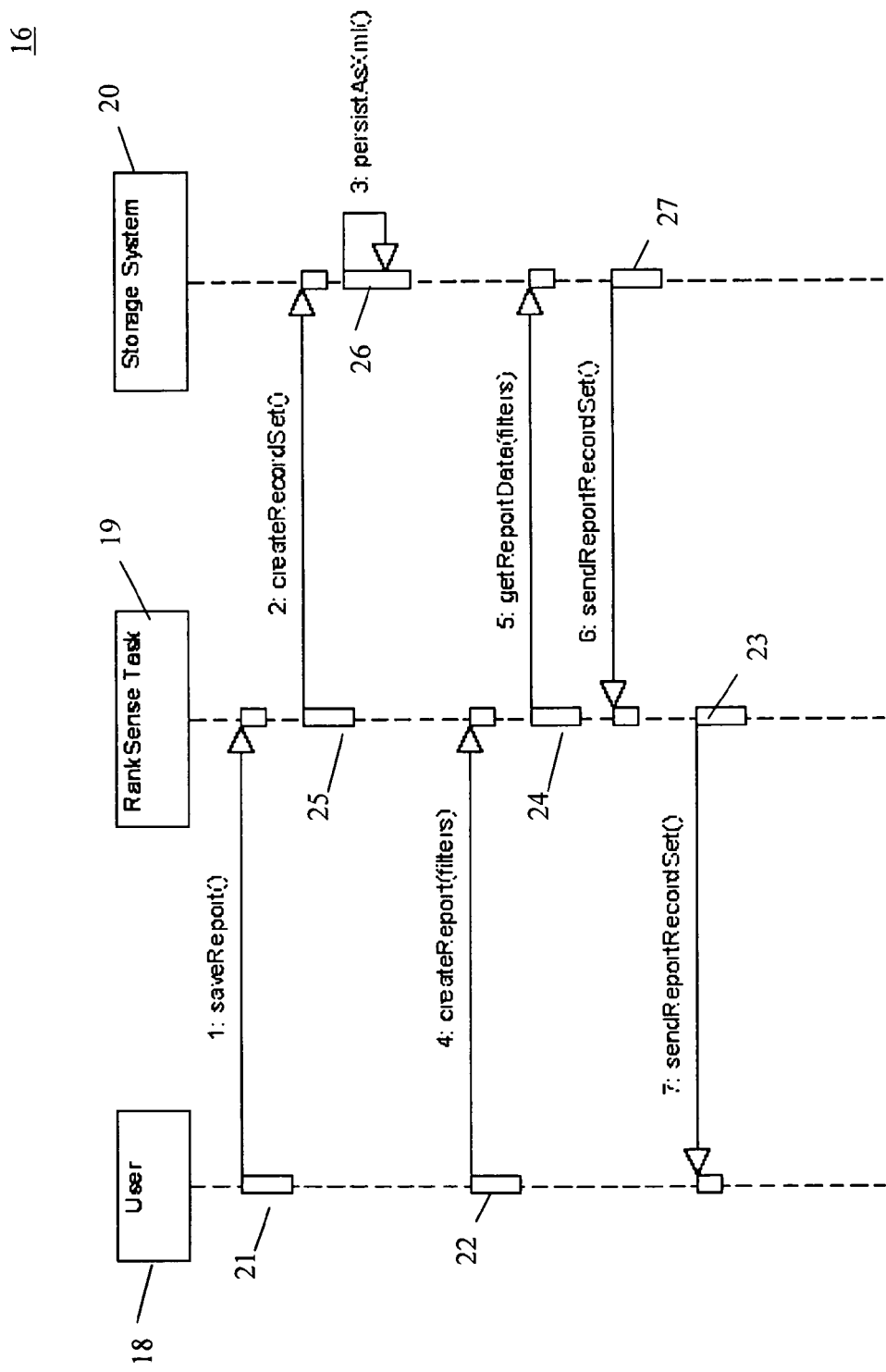
FIGS. 2-3 are a flow charts illustrating the reporting system's first inter-component relationship.

FIG. 2 illustrates the reporting system's first inter-component relationship 16. A user 18 saves a report 21, and creates report filters 22 for use by the RankSense Task 19. The RankSense Task 19 creates record sets 25 and gets the report data using or not filters 24. The storage system 20 executes the persistAsXml 26 and then sends the report record set 27 back to the ranksense task, 19 that in turn sends the report record set 23 back to the user 18.

Figure 3:
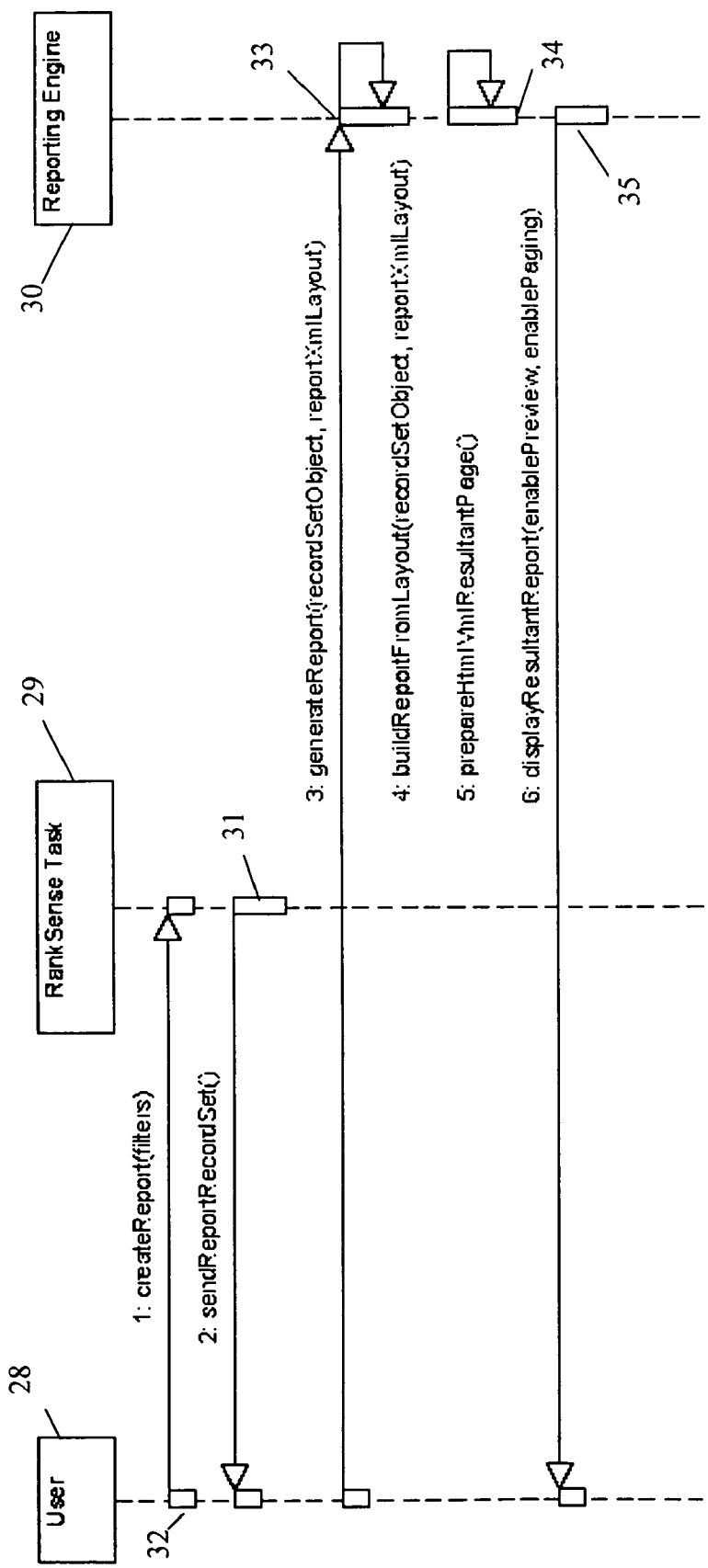

Now referring FIG. 3, the reporting system's first inter-component relationship is further illustrated. In a first step, the user 28 creates report filters 32 and sends them to the ranksense task 29, which, in turn returns a report record set 31 to the user 28. In a third step the ranksense task 29 generates reports and builds a report layout for use by the reporting engine 30. The reporting engine 30 then prepares the html page 34 and displays the resultant report 35 to the user 28.

Figure 4:
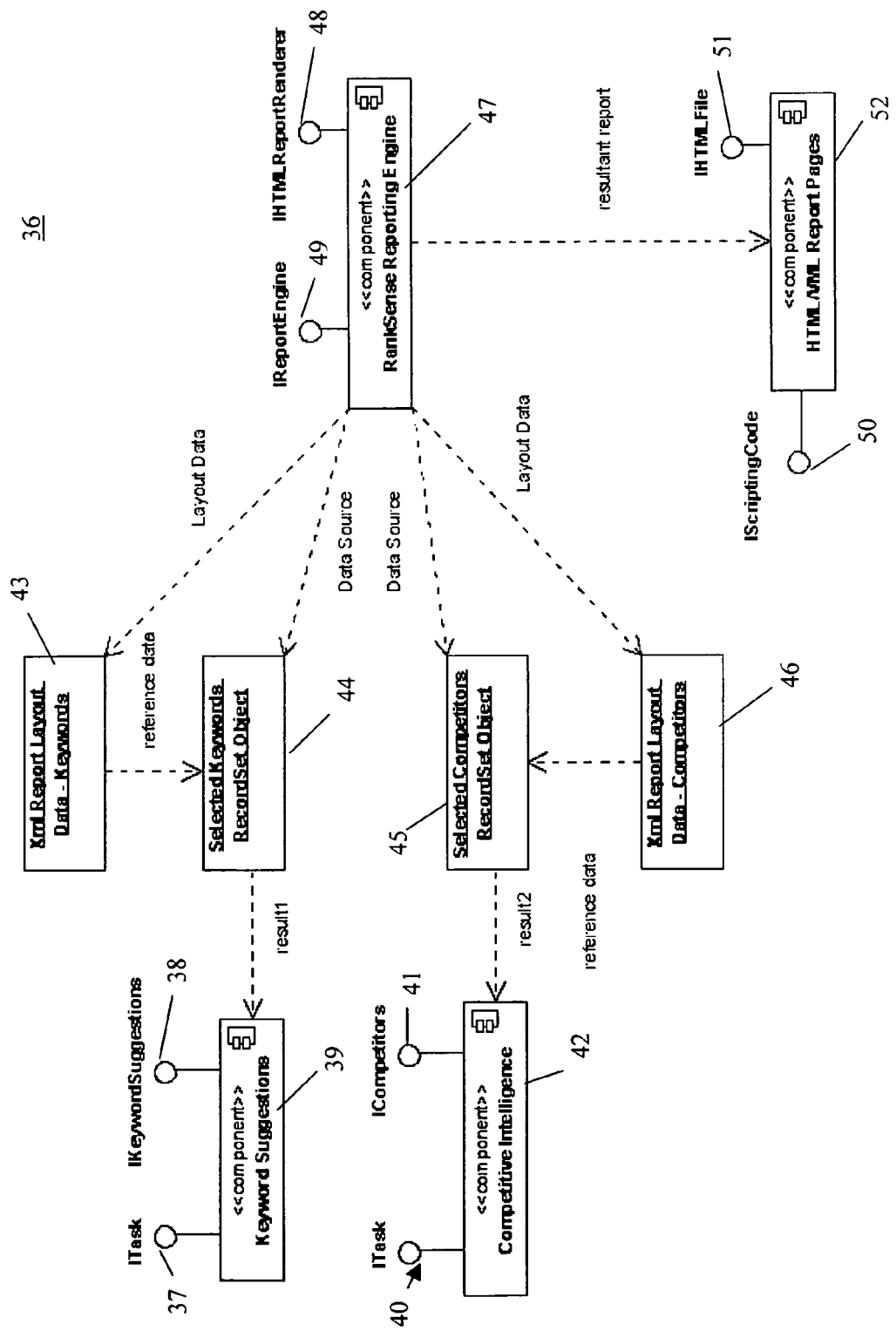
FIG. 4 is a flow chart illustrating the case where the report data comes from multiple smart tools; here Keyword Suggestions and Competitive Intelligence tools.

Now referring to FIG. 4, the case where the report data comes from multiple smart tools such as KeywordSuggestions and CompetitiveIntelligence is illustrated. The reporting engine 47 is comprised of the IReportingEngine 49 and IHTMLReportRenderer 48. The reporting engine sends resultant reports to the HTML/VML ReportPages 52; layout data to the XML Report Layout 43; data to selected keywords recordset object 44; data to the selected competitors records set object 45; and layout data to an XML report layout data set for competitors 46. The HTML/VML Report pages 52 may consist of IScriptingCode 50 and IHMTLFile, and are viewed as html documents as result 51. The selected keywords recordset object 44 receives its input form keyword suggestions 39 which are comprised of ITask 37 and IKeywordSuggestions interfaces 38. Selected Competitor Recordset Object receives its input form a competitive intelligence component 42 that consists of ITask 40 and ICompetitor interfaces 41.

The present invention provides a tool that provides using log files for hyperlink analysis in an SEO tool in an SEO suite that extracts a larger number of incoming links for the user website because it extracts that information from the website's log file. The tool does this for every single page on the website automatically. The tool uses the extracted hyperlink information to identify link rich and link poor pages. Pages in the site that don't get many links and pages on the site that get a lot of links. The idea is that the user can optimize the site by linking the link rich pages to the link poor ones.

The present invention can extract a larger number of incoming links for the user's website than traditional SEO tools that rely on querying the search engines directly. This is the case because the present invention does advanced processing of the website's log files. The present invention identifies every single page on the website and the external and internal pages that are linking to each internal page. This information is present in the referrer log files. The software uses the extracted hyperlink information to identify link rich (pages with a good number of incoming links) and link poor pages (pages with few or no links). The poor pages are less likely to be included in the search engines index and so it is important to link these pages from the rich ones and/or to get additional links to such pages.

Figures 5A, 5B:
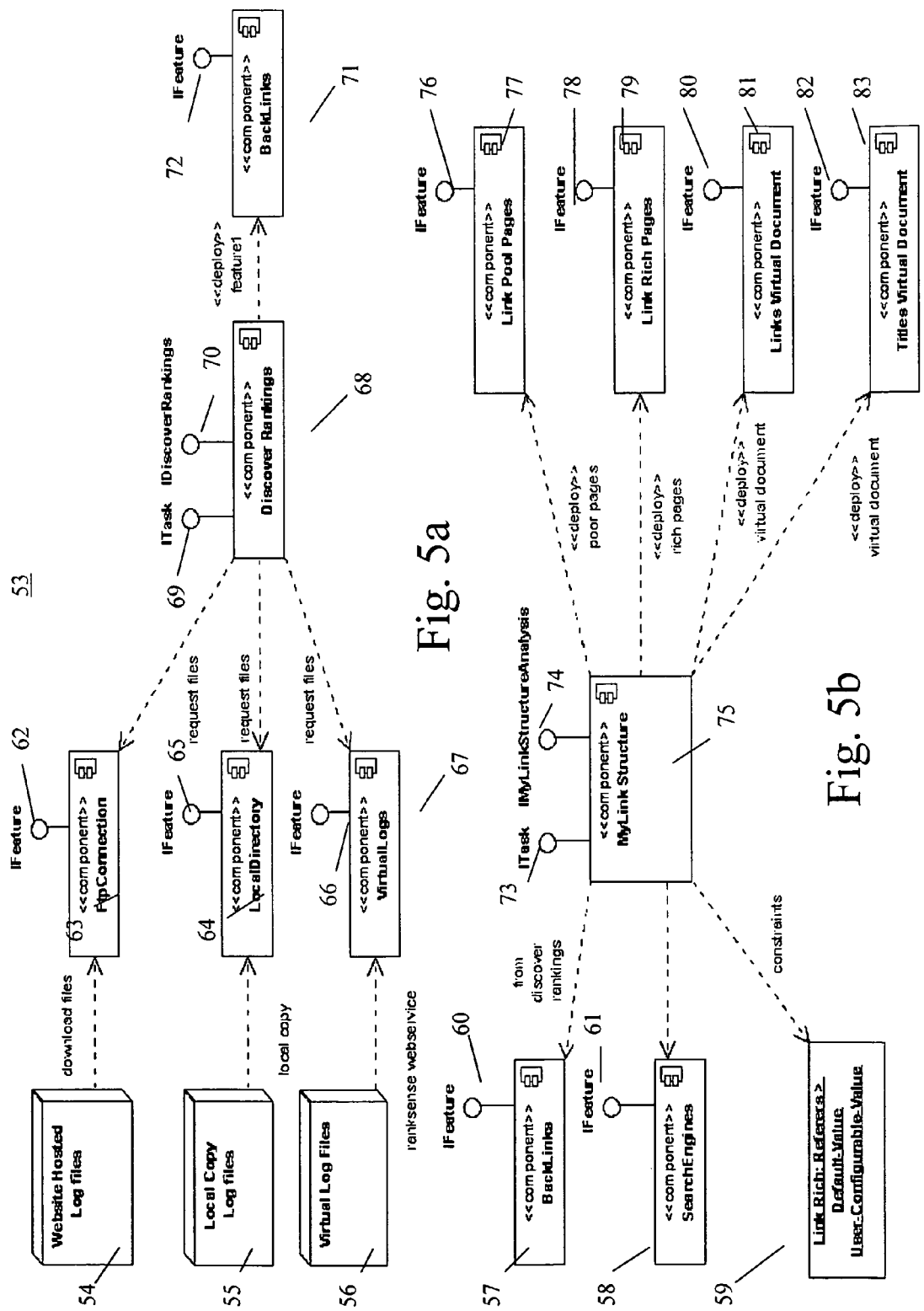
FIGS. 5a and 5b are flow charts illustrating two smart tools collaborating to provide a useful service; here discover rankings and my link structure tools.

Now referring to FIGS. 5a and 5b, two smart tools collaborate to provide this useful service: Discover Rankings 68 and My Link Structure 75. The first, Discover Rankings 6, parses the log file to extract the hyperlink information and the second, My Link Structure 75, analyses the extracted hyperlink information to determine a) the websites internal pages b) the external links to those pages c) the link rich and link poor pages. To determine the link rich and link poor pages, the second tool counts the number of external links to a page and if the pages is above a threshold (1 by default) the page is link rich, it is link poor otherwise. The threshold can be adjusted by the user.

In FIG. 5a, the discover ranking process 53 is illustrated. First, website hosted log files 54 are downloaded using a FTP Connection feature 63, which also consists of an IFeature interface 62; local copy log files 55 are copied using a Local Directory feature 64, which also implements an IFeature interface 65; and virtual log files 56 are copied to a virtual log 67 with an IFeature 66. The discover ranking component 68, which consists of an ITask 69 and IDiscoverRankings 70, requests files from the FTPConnection component 63, Local Directory 64, and Virtual Logs components 67. The DiscoverRankings component 68 then deploys backlinks 71 which also have an Ifeature 72.

Now referring to FIG. 5b, the mylink structure 75 is comprised of Itask 73 and an ImyLinkStructureAnalysis 74 and requests information from the BackLink component 57 and its corresponding IFeature 60; the search engine component 58 and its corresponding IFeature 61; and link rich reference default values 59 which are user configurable. The mylink structure 75 then: deploys poor pages to the link pool pages 77 and its Ifeature 76; deploys rich pages to the link rich pages component 79 and its Ifeature 78; deploys virtual documents links to the virtual documents links component 81 and its Ifeature 80; and deploys virtual documents titles to the virtual documents titles component 83 and its Ifeature 82.

Therefore it is an objective of the present invention to teach a competitive intelligence tool in a SEO suite whose sole purpose is to identify sites in the top ten with solid rankings and only one of them is automatically selected based in the probability of the user's site matching or beating its rankings. The tool performs some advanced analysis of the top 10 sites' traffic, age, links and other important quality metrics to help identify the long-term winners from the lucky ones that will not rank for long. Only this chosen web authority is analyzed and its relevance profile is compared to user's site in the optimization process. Once the user's site is changed to match the profile of the winner, search engines will very likely reward the site with the desired high rankings.

The present invention queries search engines using keywords needed to determine the web authority o web authorities—from the top ranking website which are the long term winners; in order to identify the winners (web authorities) the software measures a set of quality metrics from the initial set of websites. The metrics are importance, link popularity, age, traffic and position on the result page. Two weights are assigned to each metric to compute a final authority score. The URL with the highest score is automatically selected and recommended to the user. The first weight is a fixed internal weight determined empirically, the second is provided by the user via an options box. The options box comes with default values to make it easier and more convenient to the user. Users can also manually select web authorities and override default behavior. Later, the automatically selected web authorities are used to compare the on-page and off-page metrics, with the user's website URL, and all the website related pages. At the end of the process the pages are optimized by the user, following the metrics that the present invention has calculated based on the selected competitors feature. The final result is the user's optimized pages.

Figure 6:
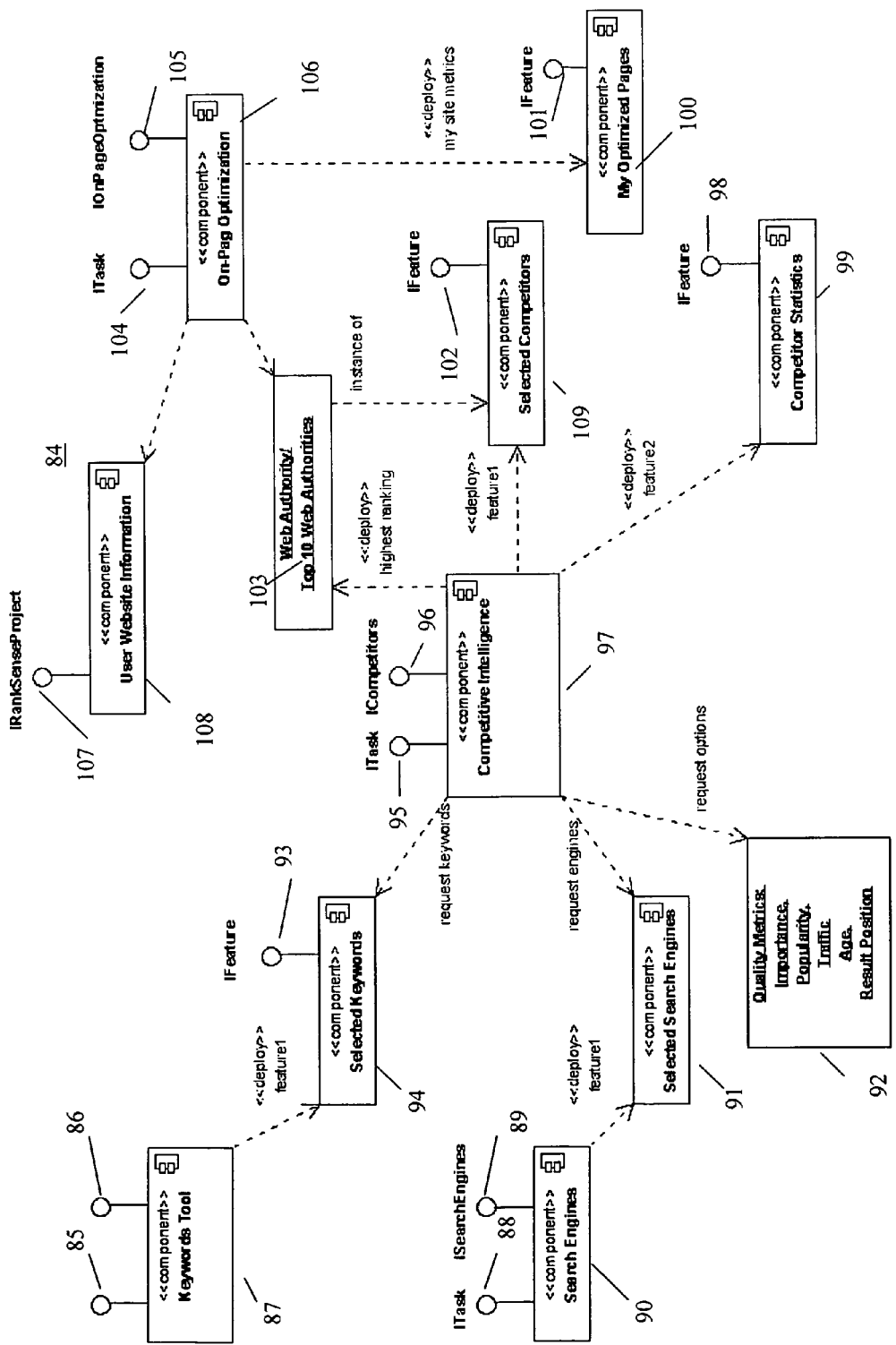
FIG. 6 is a flow chart illustrating the competitive intelligence tool that retrieves the highest authorities from the search engines, using the quality metrics options of the present invention.

Now referring to FIG. 6, the competitive intelligence tool 97 retrieves the highest authorities from the search engines using the quality metrics options. The competitive intelligence tool 97, consisting of an ITask 95 and ICompetitors interfaces 96, requests keywords from the selected keywords component 94 which includes an IFeature 93; requests engines from the selected search engines 91; and requests options such as importance, link popularity, age, traffic and position on the result page 92. The selected search engines 91 receive their information from a search engine component 90 that is further comprised of ITask 88 and ISearchEngines 89. The selected keywords 94 receive their information from keyword tools 87 that are further comprised of ITask 85 and IKeywordSuggestions interfaces 86. The competitive intelligence tool 97 deploys the highest rankings to the web authority 103; deploys features to the selected competitors component 109 that is further comprised of an IFeature 102; and deploys other features to a CompetitorStatistics component 99 that is also implements IFeature 98. The web authority 103 sends its information on to an on page optimization component 106 that is further comprised of an ITask 104 and IOnPageOptimization 105 component. The on page optimization component 106 sends information to the user website information 108 which is further comprised of system 107 and to the optimization pages 100 which also implements IFeature 101.

The present invention analyzes the logs files based on a date range, and a file filter to match specific log files; it discovers the keywords, search engines, search engine result pages (SERPs), and number of visits related to a website page for a specific url that matches the log file.

Also, the present invention can determine the exact position or ranking of that website page within the SERP, within a few attempts in a few seconds. The key invention here is that the present invention uses the log files to identify the search engines, keywords, and the result page number in the search engine. The present invention then can use that information to accurately find the exact position by checking the result page directly and the neighboring result pages in case the ranking shifted. This is considerably smarter and more efficient than simply asking users for keywords and search engines and doing a linear search from start to finish (100 pages of results) until the position is found. It is also less demanding on the search engines from a resource consumption point of view.

Figure 7:
FIG. 7 is a screen shot of a list with keywords, landing pages, search engine result page, position in results, visits and last visit date.

FIG. 7 is a screen shot from the Discover Rankings 110. Discover rankings analyzes the log files, to determine which keywords bring users to a website. The rankings, share the list with keywords 111, landing pages 112, search engine result page 113, position in results 114, visits 115, and last visit date 116.

Now referring to FIG. 8a, the DiscoverRankings component 124, consisting of ITask 125 and IDiscoverRankings interfaces 126, first parses each website log entry 118 and extracts ranking information (search engine, keyword phrase, url of landing page and search engine result page (SERP). The Discover Rankings component 124 deliver information about the Engine Keyword Rankings, as a component 130 that implements an IFeature interface 129, and the Ranking Information component 128 that also implements IFeature 127.

Now referring to FIG. 8b, the discover rankings component 124, consisting of Itask 134 and Idiscoverrankings 135, then uses this information to query the search engine 119, keyword phrases 120, Url Pages 121, and SERP 122 to find the exact position and report it using the search engine information from the log file 131. The search engine log filter 132, that implements an IFeature 133, provides filtering to the discover rankings component 123.

Figure 9:
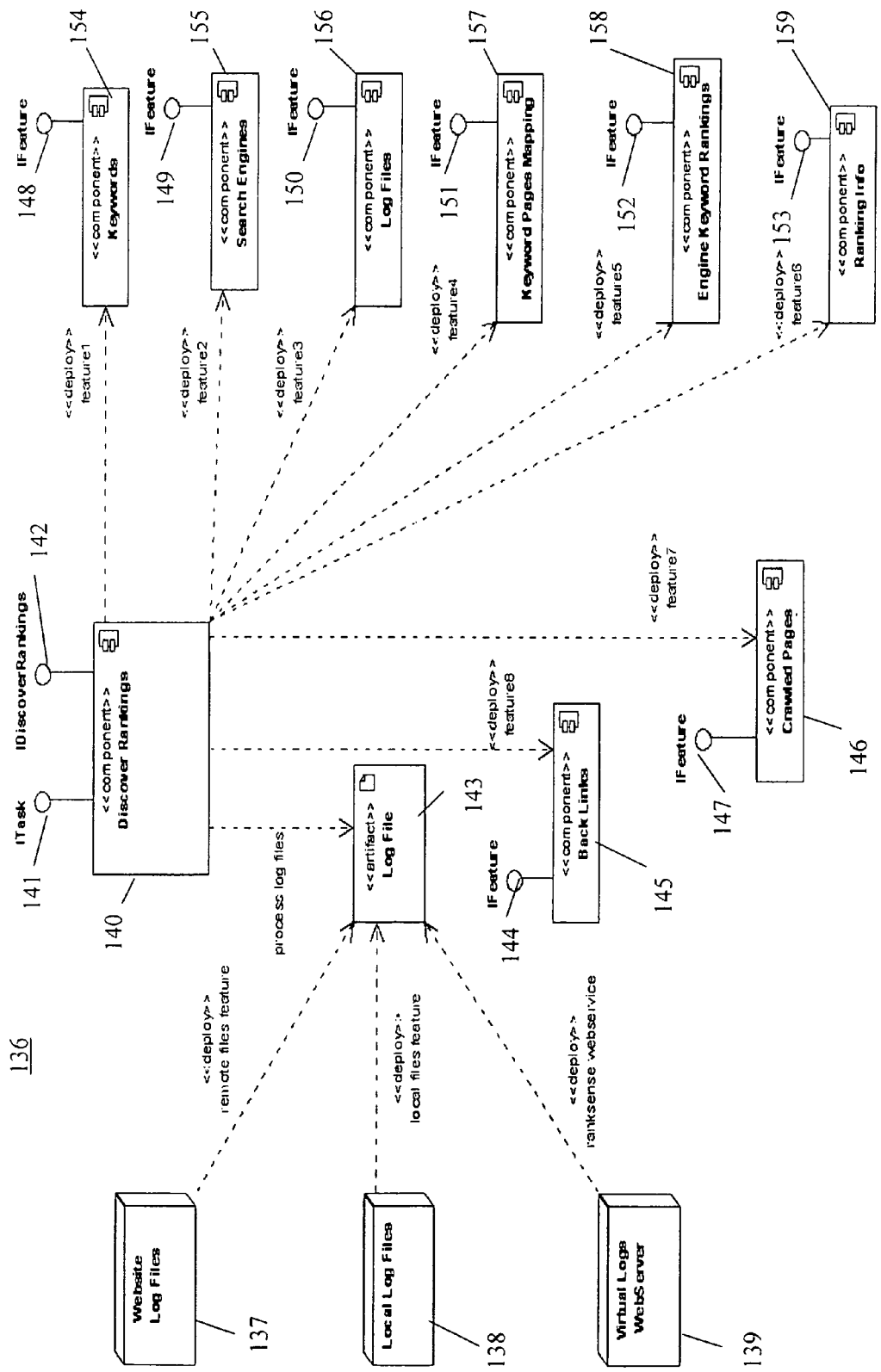
FIG. 9 is a flow chart illustrating the full object model and resultant features of the present invention.

FIG. 9 illustrates the full object model and its resultant features 136. First, the Discover Rankings component 140 and its ITask 141 and IDiscoverRankings 142, obtains log files detailed information 143, back links 145, and crawled pages 146. Log files 143 are obtained from three user-specified sources: the local computer hard disk 138, the remote server 137 (via FTP at the moment), and the virtual logs service 139. Virtual log services 139 is provided for users that do not have access to their log files. The present invention inserts a Javascript call on the pages of the website that will allow the present invention virtual log service 139 to record referral information. This information is accessible to Discover Rankings via a webservice. The Discover Rankings component 140 deploys six features, each with a corresponding Ifeature: Keyword component 154 and Ifeature 148; Search Engine Component 155 and Ifeature 149; log file component 156 and Ifeature 150; Keyword Page Mapping 157 and Ifeature 151; Engine Keyword Rankings 158 and IFeature 152; and Ranking Information Component 159 and Ifeature 153. The output of all this processing, is the features displayed in FIG. 3.

The keyword less rank checking process, originally required the user to specify the log files to be processed and the application would analyze all and every one of them. This takes considerable time and is inefficient, and some most users would not be savvy enough to adjust the file filter. A user would use the default one that basically pulls all files on the specified directory. In addition to this, users may specify a date range when running the task, and the software processes all files even if there might exist ones that are not in the date range. This is because it is not possible to tell the dates without processing the log files first.

It is another objective of the present invention to teach an intuitive on-page optimization editor for use in an SEO that not only uses the relevancy metrics extracted from the competing web authority as reference, but also show the user's website relevancy metrics in a floating panel that automatically updates as the user makes the changes to the web page. The floating panel visually shows the current values, the goal values and the action the user must take to get from the current value to the goal, in a visually intuitive way.

The present invention includes an on-page metrics optimization editor, which presents a metrics floating panel that shows the comparisons between the competitor's metrics and the user own site metrics, and help users by setting the competitors metrics as goals and the user site's metrics values as color coded bars. Green if they reach the goal and red if they miss it. We also present an arrow that point up or down depending on the action the user most take to reach the goal. The metrics included in the floating panel are: frequency, density, proximity, weight, prominence and rarity. Several metrics documented as in used by modern search engines. The color bars and arrows are automatically updated as the user types in the editor to reflect his changes.

Figure 10:
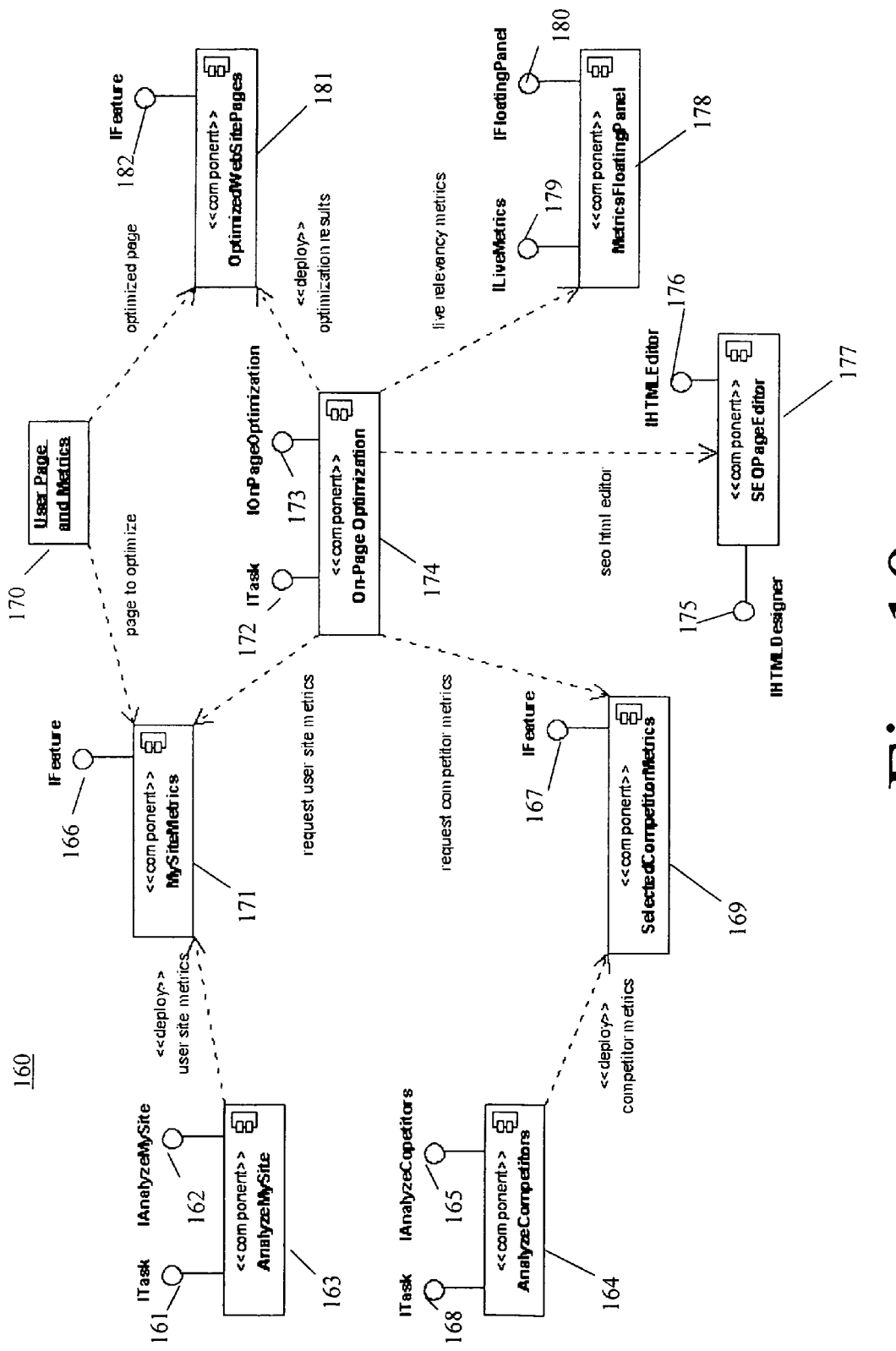
FIG. 10 is a flow chart illustrating the input and output for the on-page optimization process.

FIG. 10 shows the input and output for the on-page optimization process 160. The on page optimization component 174 is comprised of an ITask 172 and IOnPageOptimiation 173. The On Page Optimization component 174 requests user site metrics from the MySiteMetrics component 171 that implements IFeature 166. The MySiteMetrics component 171 deploys Site Metrics from the AnalyzeMySite component 163, which implements ITask 161 and IAnalyzeMySite 162 interfaces. The On Page Optimization component 174, requests competitor metrics from the Selected CompetitorMetrics component 169, which implements IFeature 167. The Selected CompetitorMetrics component 169, receives its information from the AnalyzeCompetitors component 164, which implements the ITask 168 and IAnalyzeCompetitors interfaces 165. The On Page Optimization component 174, also requests information from: the SEO page editor component 177, which implement the IHTMLDesigner 175 and IHTMLEditor 176; Metrics Floating Panel 178, implements the ILiveMetrics 179 and IFloatingPanel interfaces 180; and optimization results from the optimized website pages 181, which implements Ifeature 182. The user page and metrics 170 provides the page to optimize to the mysitemetrics component 171 and the optimized page off the optimized website pages component 181.

It is yet another objective of the present invention to teach a User Account which utilizes a License Key and an Authorization Code. This authorization code has an expiration date each time, the authorization code is used as the seed for a new one. The application uses the new authorization code moving forward and this keeps happening each time an authorization code expires. When the software runs on another machine with the same license and authorization code, only one of the machines will be in sync with the server. The rest will be out of sync as only the one that was able to renew the authorization code has the current one. The rest have the old one, and the system won't let them update.

The licensing model of the present invention is subscription based, i.e.: customer are expected to renew their license every month, quarter, semester or year. Each license entitles the owner to use the software on one computer only. In the event that a customer does not renew or tries to use the software in a another computer, the software must prevent this.

In order to do this, the software initially requests an authorization code from the present invention's licensing service and periodically renews such code to make sure the software license is valid. Each authorization code depends on the previous one, and the server will not renew if a previously valid code is not given. In the event that a user copies the software and all files to a new computer, one of the installation's authorization code will be out of sync, effectively limiting the use to a single computer—the one that successfully renewed the authorization code.

Figure 11:
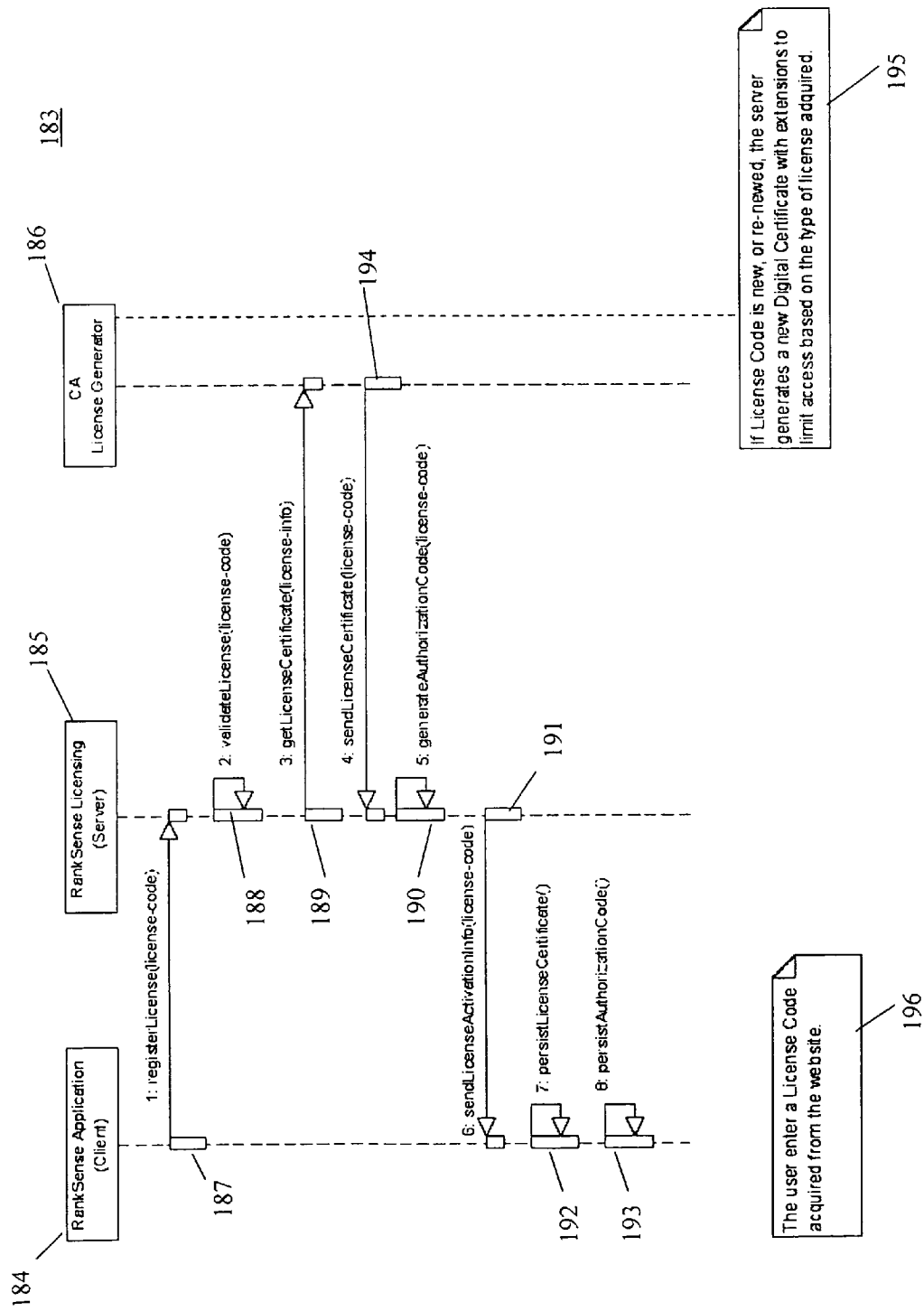
FIG. 11 is a flow chart illustrating the Registration and Activation of a License in the present invention.

Now referring to FIG. 11, the registration and activation of a license 183 is illustrated. The application client 184 first allows a user to register a license 187 with the server 185. The server then validates the license 188, obtains a license certificate 189 from the license generator 186. If the license code is new or re-newed, the sever generates a new digital certificate with extensions to limit access based on the type of license acquired 195. The license generator then sends the license certificate 194 to the server 185 where the server generates an authorization code 190 that is sent 191 to the client 184.

Finally the client 184 enters the license code 196 and the client activates the certificate 192 and authorization 193.

Figure 12:
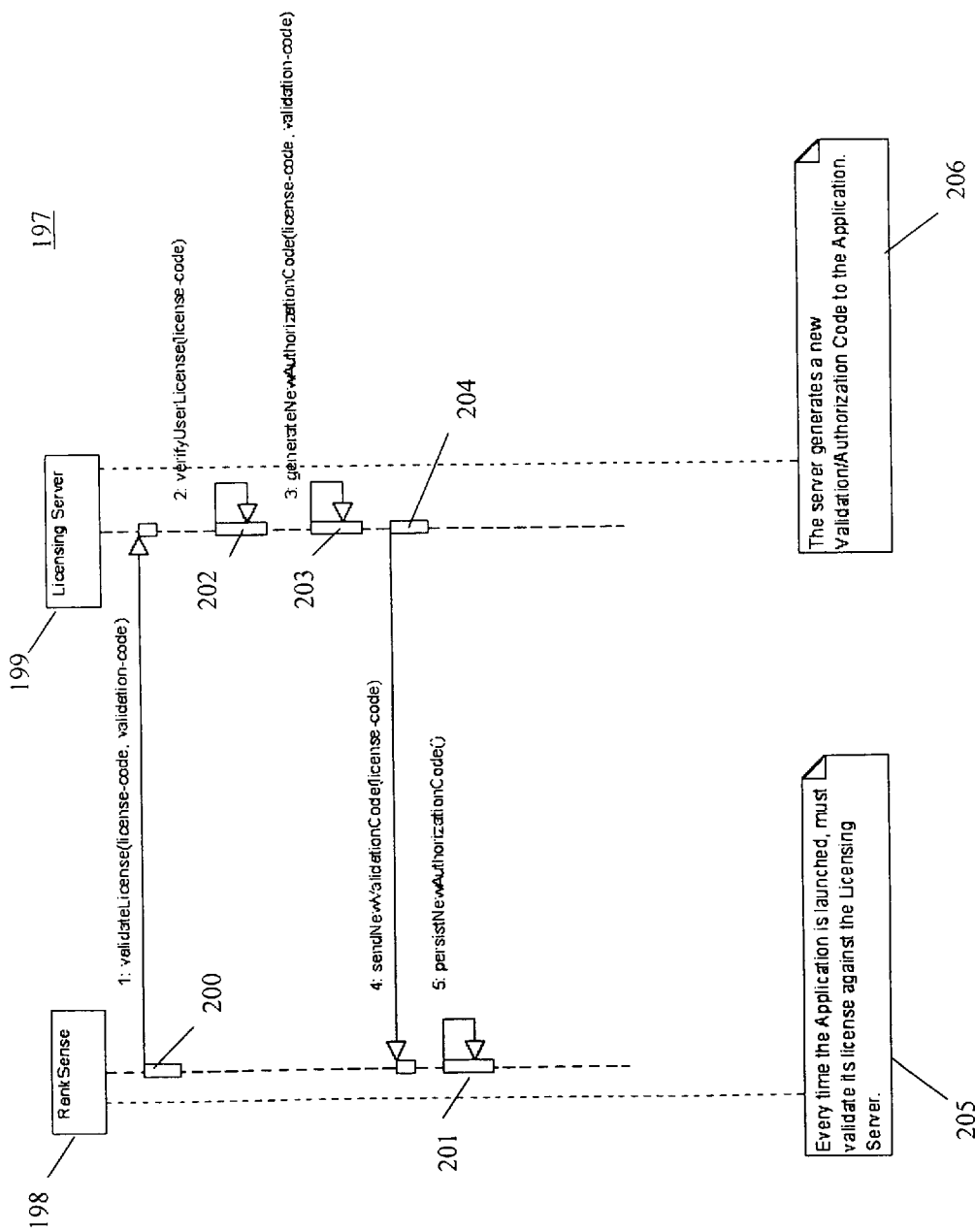
FIG. 12 is a flow chart illustrating the License Validation and Renewal of Validation Code (Authorization Code) used by the present invention.

FIG. 12 illustrates the License Validation and Renewal of Validation Code 197 (Authorization Code) of the present invention. The system 198 first validates the license code and validation code 200 and reports the validation to the license server 199. The license server 199 then verifies the user's license 202 and the authorization code 203 then sends the new verification 206 of both 204 to the system 198. The system then retains the authorizations during a session 201, and the process must be repeated every time the system application is launched 205.

All tools of the present invention can determine at runtime where exactly they must look for key user information required to complete their main goal/purpose. This information can come directly from the user or from previously run tools in the system. Once a tool finishes the results become available for the use of other tools in the system. Tools expose their information to other tools via an interface/concept referred to as Features. When a task finishes, its input and output is available in a way that can be reused for Reporting, Rendering, and for other tools. Any tool that needs a particular piece of information, will ask first for the corresponding feature and the information will be retrieved using a standard interface known in the Object Model.

In addition to this, every tool has access to global project information, so users won't have to introduce that information along with the required data, to complete the processing. The present invention can determine whether a tool can run or not, based on the features available for the task to start processing.

The present invention's tools are 'smart' by default (smart mode), also known as tasks, because they respect a workflow to make it easier and more convenient to the user. They can behave as dumb tools(classic mode), where they request needed information to complete their goal directly from users. That is the behavior of SEO suites currently in the market. This dumb mode can be seen as a compatibility mode. When in such mode, they can also extract information from other tools, but only at the request of the user, not automatically like in the smart mode.

To act as dump tools, the object model creates dynamic features based on user provided information, so making the process transparent for the tools—their implementation details don't change and the same code can behave as a smart tool or as a dumb one.

Figure 13:
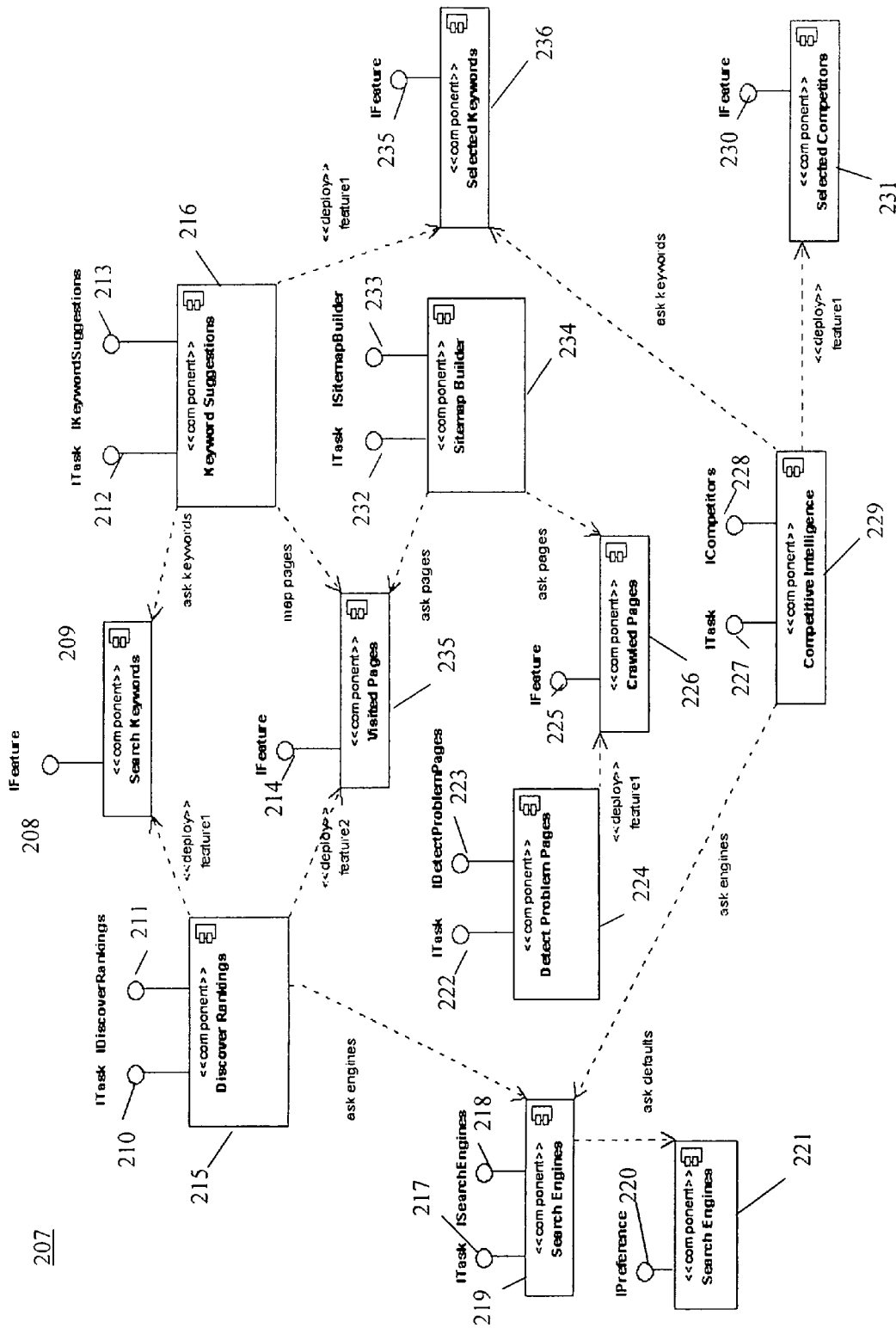
FIG. 13 is a flow chart illustrating the composition of the smart tools object model.
Figure 14:
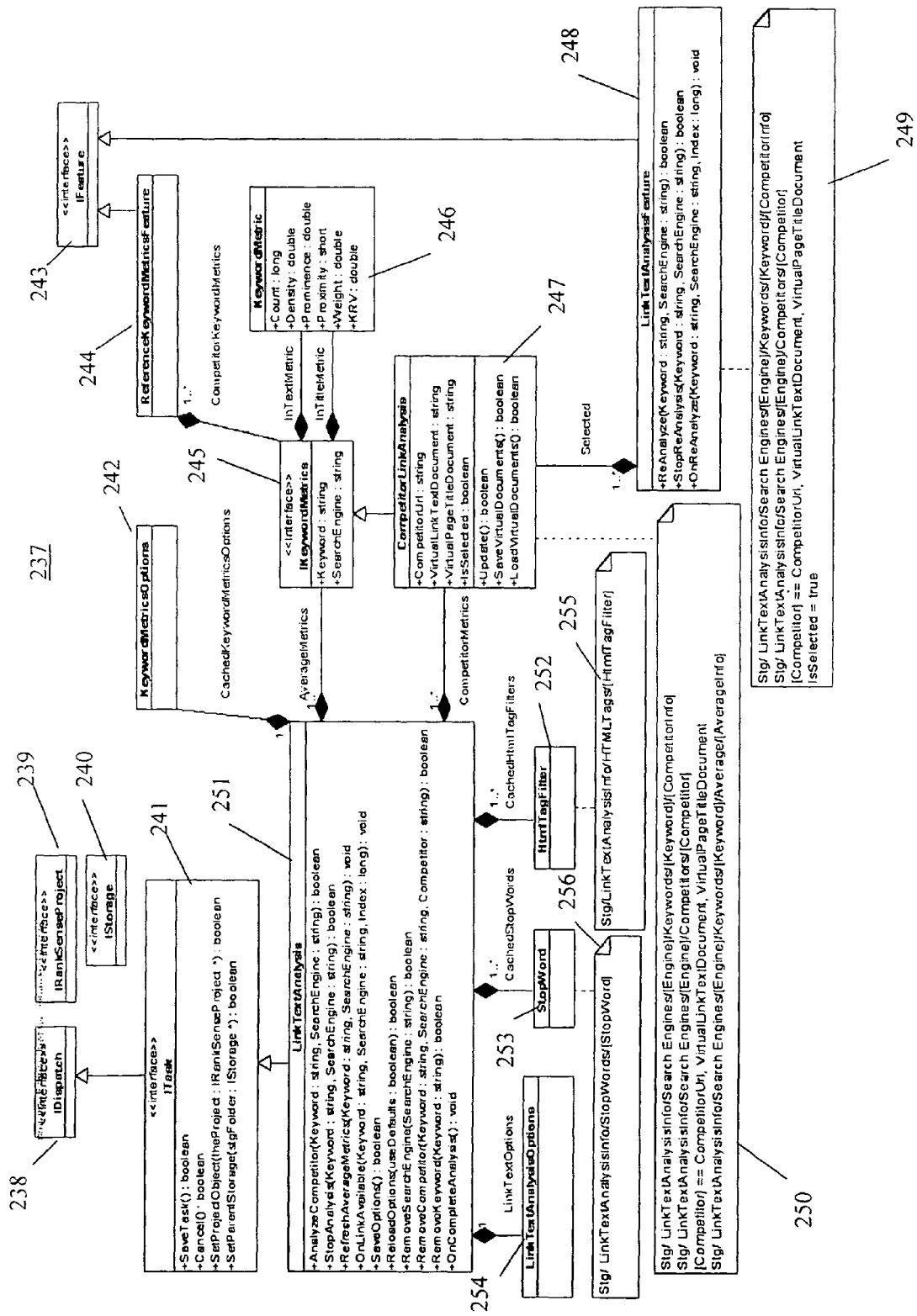
FIG. 14 is a flow chart illustrating a Sample Smart Tool class model for Link Text Analysis.
Figure 15:
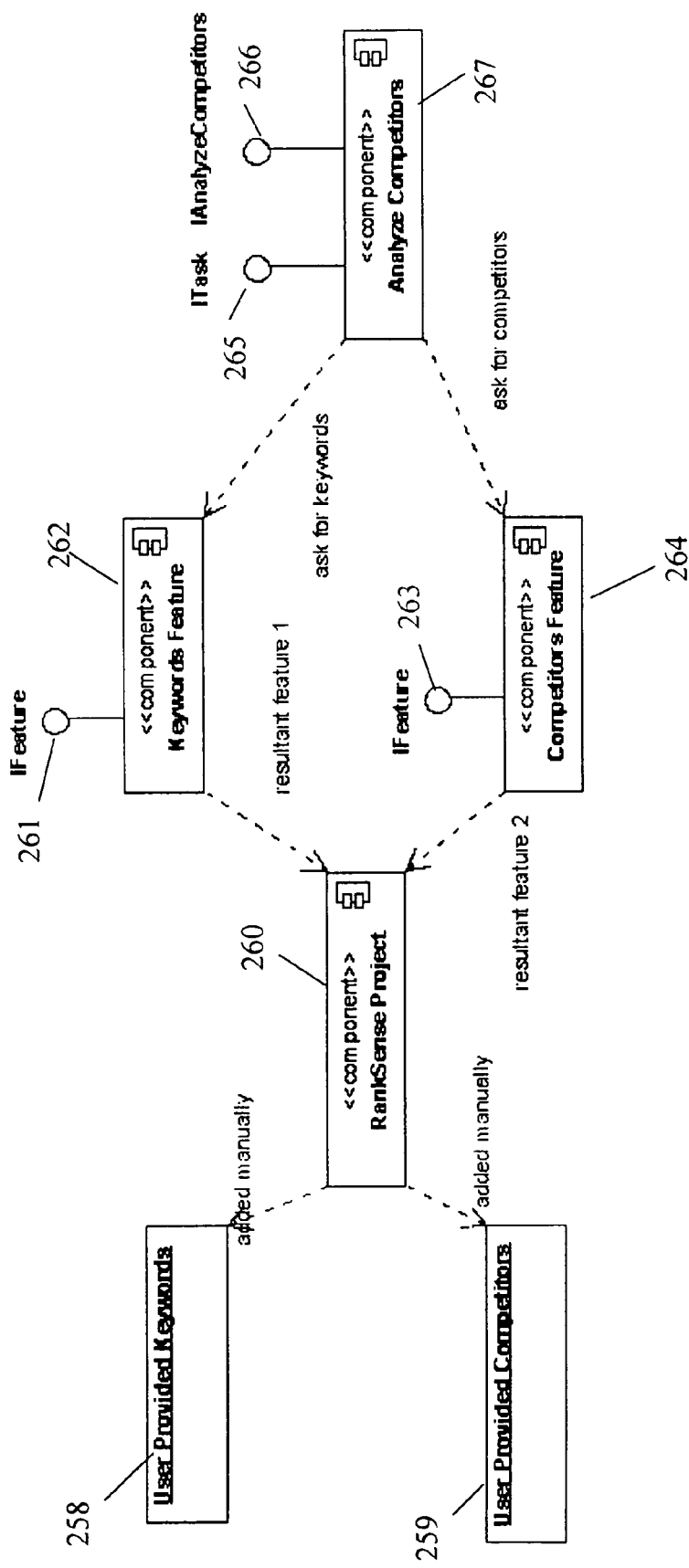
FIG. 15 is a flow chart illustrating tool behavior wherein a user enters all required data for the process of the present invention to succeed.

FIGS. 12, 14, and 15 show the relationship of classes based on the workflow collaboration from this object model. Specifically referring to FIG. 13, a fragment of the composition of the smart tools object model is illustrated. The relationship described in FIG. 13 is simple: a tool finishes and creates a feature as a result; then the next tool that needs the previous results, will ask for that feature keeping the users from having to enter that information again and again in the following tools that may need it. The Discovery Rankings component 215, which implements the ITask 210 and IDiscoverRankings interfaces 211, deploy information to: the Search Keyword component 209, which implements IFeature 208; the Visited Page component 235, that implements IFeature 214; and the Search Engine component 219, which implements the ITask 217 and ISearchEngine 218 interfaces. The Search Engine 219, asks for defaults from secondary Search Engine components 221, which implements the IPreference interface 220. A Competitive Intelligence component 229, that implements the ITtask 227 and ICompetitors 228 interfaces, receive information from the Search Engine component 219, Selected Keywords component 236, that implements IFeature 235, and Selected Competitor Component 231, which also implements IFeature 230. A Keyword Suggestions component 216, that implements the ITask 212 and IKeywordSuggestions 213, receives information from: the Search Keyword component 209, the Selected Keyword component 236, and the Visited Pages component 235, who all implement the IFeature interface 214.

Still referring to FIG. 13, a SiteMap Builder component 234, which implements the ITask 232 and ISiteMapBuilder interfaces 233, receives information from the Visited Pages component 235 and the Crawled Pages 226, who all implement the IFeature 225 interface. Finally, said Crawled Pages 226 receives pages from a Detect Problem Pages component 224, which implements the ITask 222 and IDetectProblemPages 223 interfaces.

Now referring to FIG. 14, a sample smart tool class model using Link Text Analysis 237 is illustrated. Link Text Analysis 251 is accessed by multiple interfaces; ITask 241, IDispatch 238, IRankSense 239, and IStorage 240. Link Text Analysis 251 receives its input from link text options 254, stop word 253 further comprised of an analysis component 256, and HTML tag filters 252, further comprised of an analysis component 235. Link Text Analysis 251 also receives its input from keyword metrics options 242, the IKeywordMetrics interface 245, and the Competitor Link Analysis 247. The IKeywordMetrics interface 245, is further comprised of: a Reference Keyword feature 244 that also implements the IFeature interface 243; Keyword Metrics 246; and Competitor Link Analysis 247. Competitor Link Analysis 247, is also further comprised of a link text analysis feature 248, and an analysis engine 249.

It is important to note that all tasks implement the ITask interface, and all features a tool exposes, implements the IFeature interface. Also, any preference that is required for a specific tool, is obtained asking for a preference name. All preferences implements the IPreference interface. All ITasks, IFeature, or IPreference objects are automation compatibles.

The next object model, presents the used approach of dumb tools (requires user interaction every moment). The following list describes the process employed by a tool when acting dumb: (1) User enters requested data for each step in the current Tool; (2) the present invention creates and registers the features to the current Project, based on the user input (project→AddToolFeature( )); (3) the tool asks for each feature like performed by smart tools as before; and (4) all the processing is done without having to differentiate between smart or dumb mode.

Finally referring to FIG. 15, tool behavior that requires a user to enter all required data for the process to success 257 is illustrated. The system 260 receives input from user provided keywords 258 and user provided competitors 259. Keyword features 262 and its corresponding Ifeature 261 asks for keywords from the Analayze Competitor component 267 which implements the ITask 265 and IAnalayzeCompetitors feature 266. The Competitors feature component 264, that implements the IFeature interface 163, asks for competitors from the Analayze Competitor component 267, which implements the ITask 265 and IAnalayzeCompetitors feature 266.

The present invention was created to make the software smarter and select the log files automatically for the user. The present invention adds a preprocessing step that compiles an index with the following information: log file name, web site URL, log file type, first timestamp, last timestamp. This index file is in xml format and is generated based on the following algorithm. For every log file on the specified directory, the software records the file name, opens the file, reads the first line and parses the time stamp, seeks to the end of the file and parses the timestamp. This provides the first and last timestamps and are recorded in the index. When parsing the lines, the present invention tries to identify the web server log format that is then recorded on the index for that log file.

In order to identify the URL, the present invention: reads a few lines from the top of the file (10-20) and looks at media hits (images, javascript, etc.). Those hits have the URL of the site as the referring URL. We compile several hits, count the frequency for each referral URL and select the one with the most hits as the most likely to be the URL of the site. The software that does the analysis is also modified to read the index file first, so that it can go directly to the specific log file when processing the information.

It is appreciated that the optimum dimensional relationships for the parts of the invention, to include variation in size, materials, shape, form, function, and manner of operation, assembly and use, are deemed readily apparent and obvious to one of ordinary skill in the art, and all equivalent relationships to those illustrated in the drawings and described in the above description are intended to be encompassed by the present invention.

Furthermore, other areas of art may benefit from this method and adjustments to the design are anticipated. Thus, the scope of the invention should be determined by the appended claims and their legal equivalents, rather than by the examples given.

The invention claimed is:

1. A system for search engine optimization, comprising:
several modules comprising
smart tools that provide isolation and workflow collaboration of tools in a search engine optimization (SEO) suite;
a first smart tool using log files for key-wordless rank checking;
a second smart tool using log files for hyperlink analysis;
a third smart tool identifying web authorities for competitive analysis;
a fourth smart tool providing live relevancy metrics in on-page optimization editor;
a fifth smart tool rotating authorization code to prevent usage of a software license in more than one computer;
wherein more incoming links for a user website are extracted than querying search engines directly;
wherein processing of website log files to identify every single internal page on the user website and external pages that are linking to each internal page;
wherein an identification of every single internal page on the user website and external pages that are linking to each internal page is present in a referrer log file; and
wherein extracted hyperlink information is used to identify link rich pages and link poor pages, wherein the link poor pages are less likely to be included in search engines index than the link rich pages.

2. The system for search engine optimization of claim 1, wherein the smart tools:
are fully aware of other smart tools in the search engine optimization suite and relating information collected from a user, whereby the smart tools do not need to ask the user repeatedly if the smart tools can obtain the relating information from data provided to a previously run smart tool or from the smart tools output; and
have ability to request all information directly from the user depending on an operating mode:
whereby in a first mode, the smart tools know if prerequisite tools have previously run, if not the smart tools are in not-available mode; and
whereby in a second mode, the user has ability to require the smart tools to explicitly collaborate for extra convenience.

3. The system for search engine optimization of claim 1, wherein the first smart tool using log files for key-wordless rank checking in an SEO tool further comprises:
a site URL and a web server log file for the site that corresponds with the URL to be provided; otherwise, the first smart tool will automatically detect the URL from a plurality of referrers in the log files; and
software that discovers keywords and search engines users are using to find a user site by detecting a search engine result page, by studying one of the plurality of referrers information in the log files.

4. The system for search engine optimization of claim 3, wherein the first smart tool using log files for key-wordless rank identifies an exact position on the search engine on a specific page by querying the search engine directly on the specific page and a small window of one or two pages from an identified page.

5. The system for search engine optimization of claim 1, further comprising a reporting engine wherein:
users can define and create arbitrary reports using information provided by the smart tools at runtime;
reports are defined with simple xml tags and the reporting engine extracts and combines required data from the smart tools;
said reporting engine provides advanced filtering capability to limit a display of necessary information;
the smart tools provide information to the reporting engine via record sets;
said reporting engine receives a schema that specifies the information displayed on the report; and
said reporting engine uses the schema to determine a data source, compile the data source to produce results, and generate and render reports that include text and graphics.

6. The system for search engine optimization of claim 1, wherein the second smart tool using log files for hyperlink analysis:
extracts a larger number of incoming links for a user website, wherein the second smart tool extracts information from a website log file for every single page on a website automatically; and
uses the extracted hyperlink information to identify the link rich pages and the link poor pages.

7. The system for search engine optimization of claim 1, further comprising a third smart competitive intelligence tool that:
identifies top ten sites with solid rankings and only one of the top ten sites is automatically selected based on a probability of a user site matching or beating the top ten sites rankings;
performs analysis of the top ten sites, and retrieves values for: traffic, age, links and other important quality metrics, to help identify long term winners from the sites that will not rank for the long term winners, wherein a chosen web authority is analyzed and the chosen web authority relevance profile is compared to a user site in an optimization process; and
once the user site is changed to match a profile of the long term winners, a search engines will reward the site with a desired high rankings.

8. The system for search engine optimization of claim 1, wherein the fourth smart tool providing live relevancy metrics in on-page optimization editor:

queries search engines using keywords needed to determine a web authority of a plurality of websites;
measures a set of quality metrics from an initial set of websites;
said metrics are importance, link popularity, age, traffic and position on a result page;
two weights are assigned to each metric to compute a final authority score;
a URL with a highest score is automatically selected and recommended to a user.;
a first weight is a fix internal weight determined empirically;
a second weight is provided by a user via an options box;
users can also manually select web authorities and override default behavior;
automatically selected web authorities are used to compare on-page and off-page metrics, with a user website URL, and all website related pages; and
the website related pages are optimized by the user, following a calculated metric based on the selected competitor feature resulting in the user optimized pages.

9. The system for search engine optimization of claim 1, further comprising analysis of the log files based on a date range, and a file filter to match specific log files; discovering keywords, search engines, search engine result page, and number of visits related to a website page for a specific url that matches one of the specific log files.

10. The system for search engine optimization of claim 9, wherein
an exact position or ranking of a website page within the search engine result page is determined; and
the log files identify the search engines, keywords, and the result page number in the search engine and use the search engines, keywords, and the result page number in the search engine information to accurately find the exact position by checking the result page directly and neighboring result pages to determine if the ranking shifted.

11. The system for search engine optimization of claim 1, wherein
the fifth smart tool, rotating authorization code, to prevent usage of the software license in more than one computer, wherein the software license is subscription based, wherein users are expected to renew the software license on a period basis;
wherein each software license, entitles the users to use the software license on one computer only; and
in an event that the user does not renew or tries to use the software license in a different computer, wherein use of the software license is prevented.

12. The system for search engine optimization of claim 11, wherein
an authorization code from a licensing service periodically renews the authorization code to make sure the software license is valid; and
each authorization code depends on a previous authorization code, and a server will not renew the software license, if the previous valid authorization code is not given.

13. A method for search engine optimization, comprising:
using log files for key-wordless rank checking by a first smart tool;
using log files for hyperlink analysis by a second smart tool;
identifying web authorities for competitive analysis by a third smart tool;
providing live relevancy metrics in on-page optimization editor by a fourth smart tool;
authorization code to prevent usage of a software license in more than one computer by a fifth smart tool;
extracting incoming links for a user website and querying search engines directly;
processing website log files to identify every internal page on the user website, and external pages that are linking to each internal page;
presenting the website log files in a referrer log files; and
identifying link rich pages and link poor pages from extracted hyperlink information where the link poor pages are less likely to be included in search engines index than the link rich pages.

14. The method for search engine optimization of claim 13, wherein the smart tools are fully aware of other smart tools and relating information collected from the smart tools, whereby the smart tools do not need to ask a user repeatedly if the smart tools can obtain the relating information from data provided to a previously run smart tool or from the previously run smart tool output and have ability to request all information directly from the user depending on the an operating mode.

15. The method for search engine optimization of claim 13, wherein the first smart tool using log files for key-wordless rank checking in a search engine optimization (SEO) tool:
provides a site URL and a web server log file for the site that corresponds with the URL; otherwise, the first smart tool will automatically detect the URL from a referrer in the log files; and
discovers keywords and search engines users are using to find a user site by detecting a search engine result page by studying the referrer information in the log files.

16. The method for search engine optimization of claim 13, wherein the first smart tool using log files for key-wordless rank checking in an SEO tool identifies an exact position on the search engine by querying the search engine directly on a specific page and a small window of one or two pages from an identified page.

17. The method for search engine optimization of claim 13, further comprising a reporting engine:
defining and creating arbitrary reports using information provided by the smart tools at runtime;
providing advanced filtering capability to limit a display of necessary information;
providing the necessary information to a reporting engine via record sets;
receiving a schema that specifies the information to be displayed on the report; and
using the schema to determine source data, compile the source data to produce results, and generate and render reports that include text and graphics.

18. The method for search engine optimization of claim 13, wherein the second smart tool using log files for hyperlink analysis:
extracting incoming links from a website log file for every single page on a website automatically; and
extracting hyperlink information to identify the link rich pages and the link poor pages.

19. The method for search engine optimization of claim 13, wherein a third competitive intelligence tool:
identifies sites in a top ten with solid rankings and only one of the top ten is automatically selected based on a probability of a user site matching or beating the automatically selected site ranking; and
performs analysis of the top ten sites, retrieves or determines traffic, age, links and other important quality metrics to help identify long term winners from the sites that will not rank for the long term winners, wherein a chosen web authority is analyzed and the chosen web authority relevance profile is compared to a user site in an optimization process.

20. The method for search engine optimization of claim 13, wherein the fourth smart tool providing live relevancy metrics in on-page optimization editor:
- queries search engines using keywords needed to determine a web authority of a plurality of websites;
- measures a set of quality metrics from an initial set of websites;
- assigns weights to each metric to compute a final authority score;
- automatically selects and recommends a URL with a highest score to a user where:
  - a first weight is a fix internal weight determined empirically;
  - a second weight is provided by the user via an options box;
- automatically selected web authorities to compare on-page and off-page metrics, with a user website URL, and all website related pages; and
- optimization by a user of the website related pages, following a calculated metric based on a selected competitor feature resulting in the user optimized website related pages.

21. The method for search engine optimization of claim 13, further comprising:
- analysis of the log files based on a date range;
- providing a file filter to match specific log files;
- discovering keywords, search engines, and number of visits related to a website page for a specific URL that matches the log files.

22. The method for search engine optimization of claim 21, further comprising:
- determining exact position or ranking of a website page within the search engine result page;
- identifying the search engines, keywords, and the result page number in the search engine using the log files and using search engines, keywords, and the result page number in the search engine information to accurately find an exact position by checking the result page directly and neighboring result pages to determine if the ranking shifted.

23. The method for search engine optimization of claim 13, wherein the fifth smart tool rotating authorization code:
- prevents usage of the software license in more than one computer; wherein the software license is subscription based, wherein users are expected to renew the software license on a period basis;
- entitling each software license of the user to use the software license on one computer only; and
- preventing usage of the software license in an event that the user does not renew or tries to use the software license in a different computer.

24. The method for search engine optimization of claim 23, further comprising:
- providing an authorization code from a licensing service, to periodically renew the authorization code to make sure the software license is valid; and
- renewing the software license in the server if a valid code is given where each authorization code depends on a previously given code.

* * * * *